(12) United States Patent
Korkishko et al.

(10) Patent No.: US 9,280,655 B2
(45) Date of Patent: Mar. 8, 2016

(54) APPLICATION AUTHENTICATION METHOD AND ELECTRONIC DEVICE SUPPORTING THE SAME

(71) Applicant: Samsung Electronics Co., Ltd., Gyeonggi-do (KR)

(72) Inventors: Tymur Korkishko, Gyeonggi-do (KR); Kyunghee Lee, Gyeonggi-do (KR); Andrii Lukin, Kiev (UA); Sergii Kovba, Kiev (UA); Anton Gropianov, Kyiv (UA); Sergey Belousov, Cherkasy (UA)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/209,017

(22) Filed: Mar. 13, 2014

(65) Prior Publication Data

US 2014/0283006 A1    Sep. 18, 2014

Related U.S. Application Data

(60) Provisional application No. 61/779,239, filed on Mar. 13, 2013.

(30) Foreign Application Priority Data

Dec. 17, 2013    (KR) .................. 10-2013-0157463

(51) Int. Cl.
*G06F 21/00* (2013.01)
*G06F 21/44* (2013.01)
*G06F 21/53* (2013.01)

(52) U.S. Cl.
CPC ............... *G06F 21/44* (2013.01); *G06F 21/53* (2013.01)

(58) Field of Classification Search
USPC .......................................................... 726/16
See application file for complete search history.

(56) References Cited

U.S. PATENT DOCUMENTS

| | | | | |
|---|---|---|---|---|
| 2004/0158742 | A1* | 8/2004 | Srinivasan et al. | 713/201 |
| 2006/0015748 | A1* | 1/2006 | Goto et al. | 713/190 |
| 2006/0090084 | A1* | 4/2006 | Buer | 713/189 |
| 2006/0225134 | A1* | 10/2006 | Conti | 726/22 |

OTHER PUBLICATIONS

Challenges and applications of wireless body area network (WBAN)|http://www.researchgate.net/profile/Ammad_Uddin/publication/261389318_A_Survey_of_Challenges_and_Applications_of_Wireless_Body_Area_Network_(WBAN)_and_Role_of_a_Virtual_Doctor_Server_in_Existing_Architecture/links/548dda8a0cf214269f243604.pdf|Ammad-uddin et al.|pp. 1-7|2012.*

* cited by examiner

*Primary Examiner* — Mahfuzur Rahman
(74) *Attorney, Agent, or Firm* — The Farrell Law Firm, P.C.

(57) ABSTRACT

A method for operating an electronic device is provided. The method includes executing, by a processor of the electronic device operable in a first mode (e.g. a trusted execution environment (TEE)) or a second mode (e.g. a non-trusted execution environment (NTEE)), wherein the first mode is more secure than the second mode; receiving, by the processor operating in the first mode, data or information related to a first software program stored in a first memory region; and authenticating, by the processor operating in the first mode, at least a portion of the data or information using a second software program stored in a second memory region.

16 Claims, 4 Drawing Sheets

APPLICATION AUTHENTICATION METHOD AND ELECTRONIC DEVICE SUPPORTING THE SAME

PRIORITY

This application claims priority under 35 U.S.C. §119(e) to U.S. Provisional Patent Application No. 61/779,239 filed on Mar. 13, 2013 in the U.S. Patent and Trademark Office and Korean Patent Application No. 10-2013-0157463 filed on Dec. 17, 2013 in the Korean Intellectual Property Office, the entire disclosure of each of which is incorporated herein by reference.

BACKGROUND

1. Field of the Invention

The present invention generally relates to an application authentication method and electronic device supporting the same that can authenticate an application requesting an operation at run time.

2. Description of the Related Art

Advanced electronic devices may contain a non-trusted execution environment (NTEE) and a trusted execution environment (TEE). The NTEE contains an ordinary Operating System (OS), drivers, middleware, and applications. An example of such a system is Android, which may contain the Linux kernel, device drivers, the Android execution environment, Android middleware, and applications. The TEE may contain security critical components that are accessed by NTEE components at run time to execute specific security related operations. Typically, the TEE may contain a secure OS, secure drivers, secure middleware, and trusted applications (TA). In addition, the TEE may contain a special module that handles communication between the NTEE and the TEE—the monitor. To preserve the integrity of the TEE, all components thereof are governed by a secure boot, such that the integrity of the TEE is examined at system boot time.

NTEE components may request the TEE to perform certain security critical operations. Such an NTEE component may be referred to as an NTEE client. Examples of NTEE clients may include NTEE OS native applications, Android applications, and the like. Typically, a TEE operation request issued by an NTEE client is received by the NTEE OS middleware and is forwarded to the NTEE driver, which is responsible for communication with the TEE. The NTEE client may also communicate directly with the TEE driver.

The TEE driver forwards the request for TEE operation to the monitor. The monitor switches to the TEE and passes the request to a Request Handler of the secure OS. The secure OS identifies a suitable trusted application to handle the request and sends the request to the identified trusted application to perform a specified operation. The secure OS may send the request directly to the trusted application or send the same through the secure middleware layer. Upon receiving the request, the trusted application executes the requested operation.

Meanwhile, a TEE operation request may contain some data to be processed by a corresponding trusted application. A TEE operation request may also contain a reference to data in the NTEE memory that has to be processed. In addition, a TEE operation request may contain a reference to the NTEE memory where results of the TEE operation are to be placed. The system memory is configured in such a way that the NTEE memory is fully accessible by the TEE secure OS for read and write operations and the TEE memory is blocked from any access by NTEE components.

Since a trusted application in the TEE may perform a security critical operation only for a specific NTEE component, it is important for the trusted application to check the integrity of an NTEE client that has requested such an operation.

Existing solutions, such as ARM TrustZone Client API Specification 3.0 and Global Platform Client API Specification 1.0, provide a mechanism for such an NTEE client integrity check. Namely, both specifications instruct the NTEE environment to collect specific information about the client and send the collected information to the TEE trusted application through the TEE driver as so-called "log-in information". For example, the NTEE environment may check integrity of the NTEE client by calculating a hash of the NTEE client executable file. Another example is to forward some NTEE client supplied data as an authentication token for the TEE trusted application.

Such an approach requires that all NTEE components engaged in NTEE client authentication be trusted by the TEE trusted application. Namely, the TEE trusted application should trust the NTEE OS, NTEE driver and NTEE middleware. However, practical implementation of the NTEE often assumes that some of the NTEE components may be freely changed and thus cannot be trusted by the TEE.

For example, the NTEE middleware may be changed by malicious software in such a way that a hash of a malicious NTEE client executable file is substituted by the hash of the valid NTEE client executable file. The NTEE driver can be replaced with a different one that intercepts client identification data and provides the same to a malicious NTEE client.

Under the condition that NTEE components can be changed by malicious software, existing solutions based on NTEE client authentication using NTEE components cannot provide a high level of security. Hence, the TEE trusted application cannot fully trust the NTEE client authentication data provided by NTEE components.

SUMMARY

The present invention has been made to address at least the above mentioned problems and/or disadvantages and to provide at least the advantages described below.

Accordingly, an aspect of the present invention is to provide a mechanism for authenticating an NTEE client, which requests a corresponding trusted application to perform an operation, using TEE components trusted by the trusted application. In addition, an aspect of the present invention is to provide an application authentication method and electronic device supporting the same that can reliably authenticate an NTEE client in execution.

In accordance with an aspect of the present invention, a method for operating an electronic device is provided. The method includes executing, by a processor of the electronic device operable in a first mode or a second mode, the first mode, wherein the first mode is more secure than the second mode; receiving, by the processor operating in the first mode, data or information related to a first software program stored in a first memory region; and authenticating, by the processor operating in the first mode, at least a portion of the data or information using a second software program stored in a second memory region.

In accordance with another aspect of the present disclosure, an electronic device is provided. The electronic device includes a memory unit configured to have a first region and a second region; and a processor configured to execute a first mode and a second mode wherein the first mode is more secure than the second mode, wherein the processor receives data or information related to a first software program stored in the first region of the memory unit in the first mode and authenticates at least a portion of the received data or information using a second software program stored in the second region thereof in the first mode.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

The electronic device of the present invention is a device containing the NTEE and TEE. For example, the electronic device may be a smartphone, tablet computer, mobile phone, video phone, e-book reader, desktop computer, laptop computer, netbook computer, personal digital assistant, portable multimedia player, MP3 player, mobile medical instrument, electronic bracelet, electronic necklace, electronic appcessory, camera, wearable device, electronic clock, wrist watch, home appliance (such as a refrigerator, air conditioner, cleaner, oven, washing machine, or air cleaner), intelligent robot, TV, digital video disc, audio system, medical instrument (such as a Magnetic Resonance Angiography (MRA) scanner, Magnetic Resonance Imaging (MRI) scanner, Computed Tomography (CT) scanner, tomograph, or ultrasonic diagnostic equipment), navigation aid, Global Positioning System (GPS) receiver, Event Data Recorder (EDR), Flight Data Recorder (FDR), set-top box, streaming box (such as Samsung HomeSync, Apple TV or Google TV), electronic dictionary, car infotainment device, marine electronic device (such as a marine navigation system or gyrocompass), avionics instrument, security equipment, electronic clothing, electronic key, camcorder, game console, head-mounted display, flat panel display device, electronic frame, electronic album, part of a furniture or building supporting communication, electronic board, electronic signature receiver, projector, and the like, or a combination thereof. It should be understood by those skilled in the art that the electronic device of the present invention is not limited thereto.

In the following description, the word "module" refers to a software component, a hardware component, a firmware component or a combination thereof, which is capable of carrying out a function or an operation. "Module" may be used interchangeably with "unit", "block", "circuit" or the like. A module may be implemented mechanically or electronically. For example, a module having a specific function may be implemented using at least one of an Application-Specific Integrated Circuit (ASIC), a Field-Programmable Gate Array (FPGA) and a Programmable-Logic Device (PLD).

Figure 1:
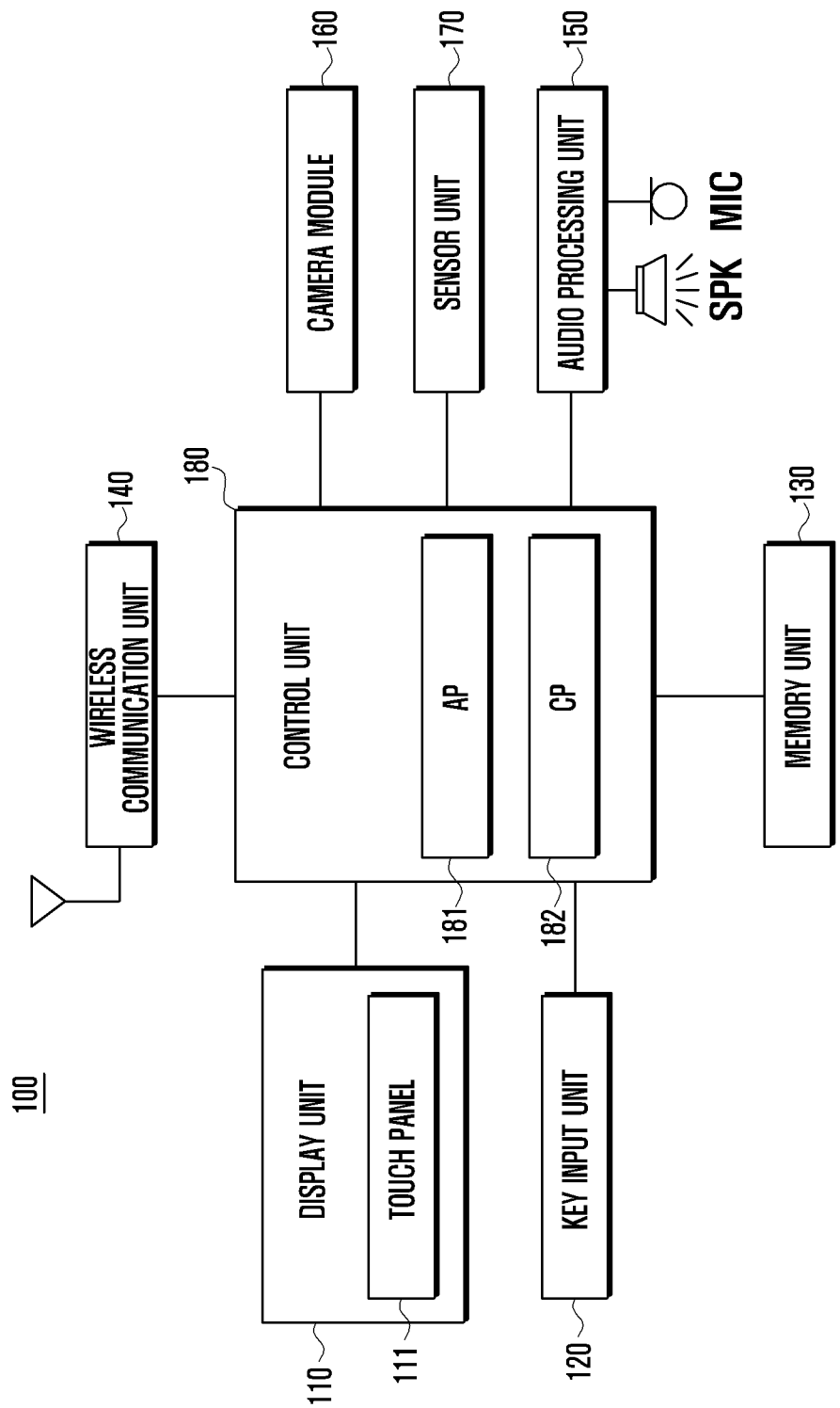
FIG. 1 is a block diagram of an electronic device according to an embodiment of the present invention.

FIG. 1 is a block diagram of an electronic device 100 according to an embodiment of the present invention.

Referring to FIG. 1, the electronic device 100 includes a display unit 110, a key input unit 120, a memory unit 130, a wireless communication unit 140, an audio processing unit 150 including a speaker SPK and a microphone MIC, a camera module 160, a sensor unit 170, and a control unit 180.

The display unit 110 displays data on the screen under control of the control unit 180. That is, when the control unit 180 stores processed (e.g. decoded or resized) data in a data storage (e.g. internal memory of the display unit 110 or the memory unit 130), the display unit 110 converts the stored data into an analog signal and displays the analog signal on the screen. The display unit 110 may include a display panel or a holographic panel. The display panel may be realized using Liquid-Crystal Display (LCD) devices or Active-Matrix Organic Light-Emitting Diodes (AMOLED). The display panel may be configured to be flexible, transparent or wearable. The display panel may be combined with a touch panel 111 to form a single module. The holographic panel may use light interference to display a three-dimensional image in the air. The display unit 110 may include a control circuit to control the display panel or holographic panel.

The touch panel 111 may be placed on the display panel of the display unit 110. Specifically, the touch panel 111 may be an add-on type (placed on the display panel) or an on-cell or in-cell type (inserted into the display panel).

The touch panel 111 may be a capacitive, resistive, infrared or ultrasonic touch panel to detect user input and send an event corresponding to the user input to the control unit 180. The touch panel 111 may include a controller (not shown). For example, the controller may determine a representative one of touch points and send coordinate information of the representative touch point to the control unit 180. Alternatively, the control unit 180 may directly control touch operation of the touch panel 111.

The key input unit 120 includes one or more touch keys that can detect contact with or proximity to a finger or an object. The key input unit 120 may generate an event corresponding to user input (e.g. share or play) and send the event to the control unit 180. The key input unit 120 may further include a different type of key than touch keys. For example, the key input unit 120 may include at least one dome key.

The memory unit 130 stores data generated by the electronic device 100 or received from an external device (for example, a server, desktop computer or tablet computer) through the wireless communication unit 140 under control of the control unit 180.

The memory unit 130 includes a main memory and a secondary memory. The main memory may include a Random Access Memory (RAM). The secondary memory may include a disk, RAM, Read Only Memory (ROM), and flash memory. The main memory may store various programs, such as a boot program, operating system and applications, loaded from the secondary memory. When the electronic device 100 is turned on, a boot program is loaded into the main memory first. The boot program loads the operating system into the main memory. The operating system may load a specific application into the main memory for execution. The control unit 180 (such as an application processor) may access the main memory, fetch instructions of the application, decode the instructions, and execute operations according to decoding results. That is, a program may be loaded into the main memory and executed by a processor such as an application processor. The memory unit 130 may further include, as an external memory, a memory card such as a CF (Compact Flash), SD (Secure Digital), Micro-SD, Mini-SD, xD (extreme Digital) or a Memory Stick.

The wireless communication unit 140 performs voice, video or data communication with an external device through a network under control of the control unit 180. The wireless communication unit 140 may include a radio frequency transmitter for upconverting the frequency of a signal to be transmitted and amplifying the signal, and a radio frequency receiver for low-noise amplifying a received signal and downconverting the frequency of the received signal. The wireless communication unit 140 may include a mobile communication module (based on 3G, 3.5G or 4G mobile communication), a digital broadcast reception module (such as a Digital Multimedia Broadcasting (DMB) module), and a local area communication module (such as a Wi-Fi module, Bluetooth module or Near Field Communication (NFC) module).

The audio processing unit 150 inputs and outputs audio signals for speech recognition, voice recording, digital recording and calls in cooperation with the speaker SPK and microphone MIC. The audio processing unit 150 converts a digital audio signal from the control unit 180 into an analog audio signal through digital to analog (D/A) conversion, amplifies the analog audio signal, and outputs the amplified analog audio signal to the speaker SPK. The audio processing unit 150 converts an analog audio signal from the microphone MIC into a digital audio signal through analog to digital (A/D) conversion and sends the digital audio signal to the control unit 180. The speaker SPK converts an audio signal from the audio processing unit 150 into a sound wave and outputs the sound wave. The microphone MIC converts a sound wave from a person or other sound source into an audio signal.

The camera module 160 captures still images or moving images. The camera module 160 may include at least one image sensor such as a front lens or rear lens, an image signal processor, and an LED flash.

The sensor unit 170 senses a physical quantity (such as acceleration, pressure, amount of light) or a change therein and sends sensed information (e.g. a voltage change Δv) to the control unit 180. The sensor unit 170 senses the state of the electronic device 100 (e.g. movement) and sends sensed information to the control unit 180. The sensor unit 170 may include at least one of a gesture sensor, gyro sensor, atmospheric pressure sensor, magnetic sensor, acceleration sensor, grip sensor, proximity sensor, RGB (red, green and blue) sensor, biometric sensor, temperature sensor, humidity sensor, illumination sensor, and ultraviolet sensor. The sensor unit 170 may further include an electronic nose sensor, electromyography sensor, electroencephalogram sensor, electrocardiogram sensor, or fingerprint sensor. The sensor unit 170 may further include a control circuit to control at least one of the sensors therein. Sensors of the sensor unit 170 may be implemented as a single chip or may be separately implemented as multiple chips.

The control unit 180 controls the overall operation of the electronic device 100, controls signal exchange between internal components thereof, performs data processing, and controls supply of power from a battery to the internal components. The control unit 180 may include one or more processors. For example, the control unit 180 includes at least one Application Processor (AP) 181 and at least one Communication Processor (CP) 182. The AP 181 and CP 182 may be formed as a single integrated circuit package or may be formed as separate integrated circuit packages.

The AP 181 executes the operating system or applications to control hardware and software so as to process various data and perform various operations. The AP 181 may be implemented as a System on Chip (SoC). In one embodiment, the control unit 180 may further include a Graphics Processing Unit (GPU).

The CP 182 performs data link management and protocol conversion for communication between the electronic device 100 and external devices through networks. The CP 182 may be implemented as a System on Chip (SoC). The CP 182 may perform a part of multimedia control. For example, the CP 182 may perform terminal identification and authentication in a communication network using a Subscriber Identity Module (SIM) card. The CP 182 may provide the user with services related to voice calls, video calls, text messages and packet data. The CP 182 may control data transmission and reception of the wireless communication unit 140.

The AP 181 or CP 182 may load instructions or data received from a nonvolatile memory or another component in a volatile memory for execution. The AP 181 or CP 182 store data received from or created by another component in the nonvolatile memory.

Figure 2:
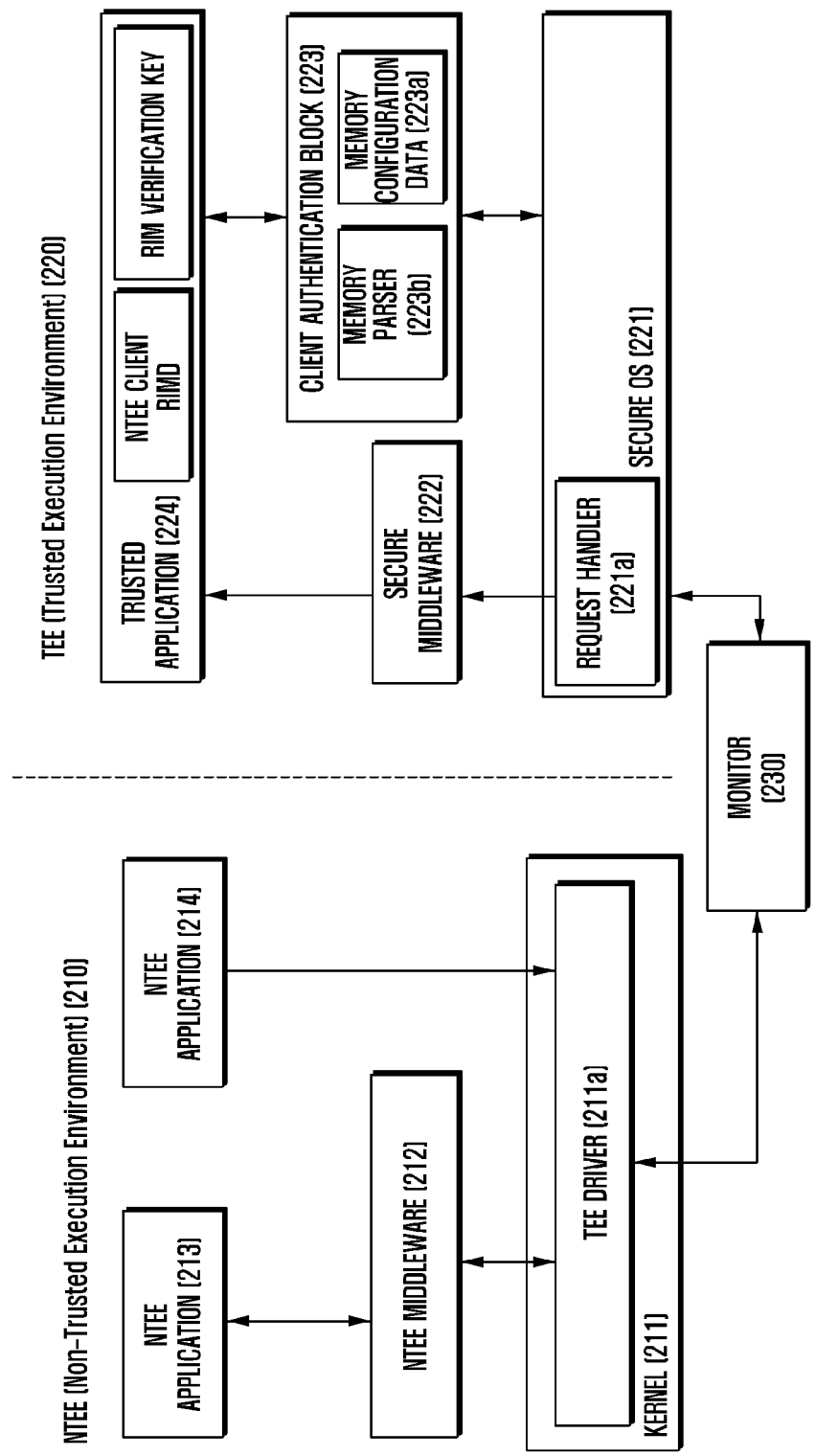
FIG. 2 is a block diagram of a programming module according to an embodiment of the present invention.

FIG. 2 is a block diagram of a programming module 200 according to an embodiment of the present invention.

The programming module 200 may reside in the main memory (memory unit 130) of the electronic device 100. The programming module 200 may be composed of software, hardware, firmware, or a combination thereof. The programming module 200 includes an NTEE 210, a TEE 220, and a monitor 230.

The NTEE 210 includes a kernel 211, NTEE middleware 212, and NTEE applications 213 and 214. The kernel 211 controls and manages system resources, such as a bus, processor or memory, used to support operations or functions of the NTEE middleware 212, NTEE Application Programming Interface (API) (not shown), and the NTEE applications 213 and 214. The kernel 211 provides an interface that enables the NTEE middleware 212, NTEE API and NTEE applications 213 and 214 to access, control and manage individual components of the electronic device 100. The kernel 211 may include a system resource manager and drivers. The system resource manager performs resource control and resource allocation and release. The drivers control input and output of corresponding components according to commands from the kernel 211. The drivers may include a display driver, memory driver, USB driver, keypad driver, Wi-Fi driver, audio driver and the like. In particular, the drivers may include a TEE driver 211a.

The NTEE middleware 212 relays data between the NTEE API or NTEE applications 213 and 214 and the kernel 211. As part of handling processing requests from the NTEE applications 213 and 214, the NTEE middleware 212 loads balance system resources by, for example, assigning priorities to the processing requests.

The NTEE API provides interfaces and functions that may be invoked by the NTEE applications 213 and 214 to use or control services provided by the NTEE middleware 212 and the kernel 211. Here, the services may be related to management or control of files, windows, images, characters and the like.

The NTEE applications 213 and 214 include a preloaded application, a native application, a third party application and the like.

The TEE 220 includes a secure OS 221, a secure middleware 222, a client authentication block 223 responsible for NTEE client authentication, and a trusted application 224. The secure OS 221 controls and manages system resources needed to support operations or functions of the secure middleware 222, the client authentication block 223, the TEE API (not shown) and the trusted application 224. The secure OS 221 provides an interface that enables the secure middleware 222, TEE API and trusted application 224 to access, control and manage individual components of the electronic device 100. The secure OS 221 controls (e.g. block or permit) access (e.g. read or write operation) from the NTEE 210. The secure OS 221 includes a request handler 221a, which receives and processes a TEE operation request from the NTEE 210. Here, the TEE operation request may contain identification information of a corresponding NTEE client (e.g. NTEE application).

The secure middleware 222 relays data between the TEE API or trusted application 224 and the secure OS 221. As part of handling processing requests from the trusted application 224, the secure middleware 222 loads balance system resources by, for example, assigning priorities to the processing requests.

The client authentication block 223 authenticates an NTEE client (i.e. NTEE application) having issued a TEE operation request. Specifically, upon reception of an authentication request for an NTEE client from the trusted application 224, the client authentication block 223 determines whether to authenticate the NTEE client and sends the determination result to the trusted application 224. The trusted application 224 may accept the request from the NTEE client and perform a requested operation or may reject the request therefrom according to the determination result. The client authentication block 223 contains memory configuration data 223a for access to NTEE memory. The client authentication block 223 also includes a memory parser 223b for memory analysis.

The trusted application 224 corresponds to a preloaded application, a native application or a third party application. In particular, the trusted application 224 provides the client authentication block 223 with parameters used to authenticate an NTEE client, such as an NTEE client identifier, NTEE client Reference Integrity Measurement Data (RIMD) and a Reference Integrity Metric (RIM) verification key.

The monitor 230 handles interaction between the NTEE 210 and the TEE 220. The NTEE 210 may be not allowed to directly access the TEE 220 and may be allowed to access the TEE 220 via the monitor 230. Here, for example, TrustZone technology from Advance RISC Machine (ARM) may be applied to the operation of the monitor 230.

Figure 3:
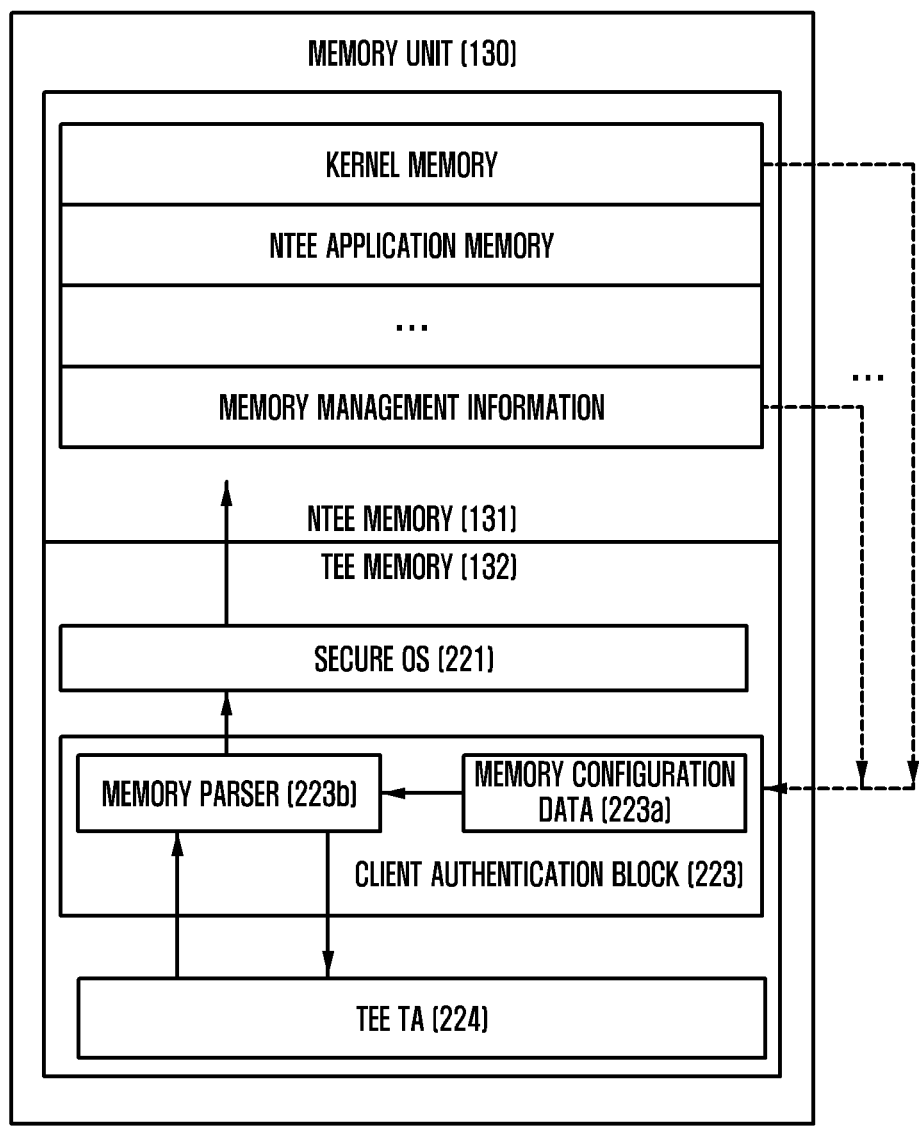
FIG. 3 illustrates a memory layout according to an embodiment of the present invention.

FIG. 3 illustrates a memory layout according to an embodiment of the present invention.

Referring to FIG. 3, the memory unit 130 includes an NTEE memory region 131 and a TEE memory region 132. The NTEE memory region 131 and the TEE memory region 132 correspond to one or more physical memory components or to a combination of heterogeneous memory components. The NTEE memory region 131 is set so that a TEE component such as the secure OS 221 may access the same for read and write operations. The TEE memory region 132 is set so that an unauthenticated NTEE component cannot access the same. The memory parser 223b accesses the NTEE memory region 131 for reading and parsing. The memory parser 223b accesses the NTEE memory region 131 through the secure OS 221. The memory parser 223b operates according to the memory configuration data 223a and an authentication request from a TEE trusted application 224. The memory configuration data 223a contains information about NTEE memory locations of various application-related control structures in the NTEE OS kernel. Namely, NTEE client control data structures contain at least NTEE client identification information and NTEE client memory management information.

Figure 4:
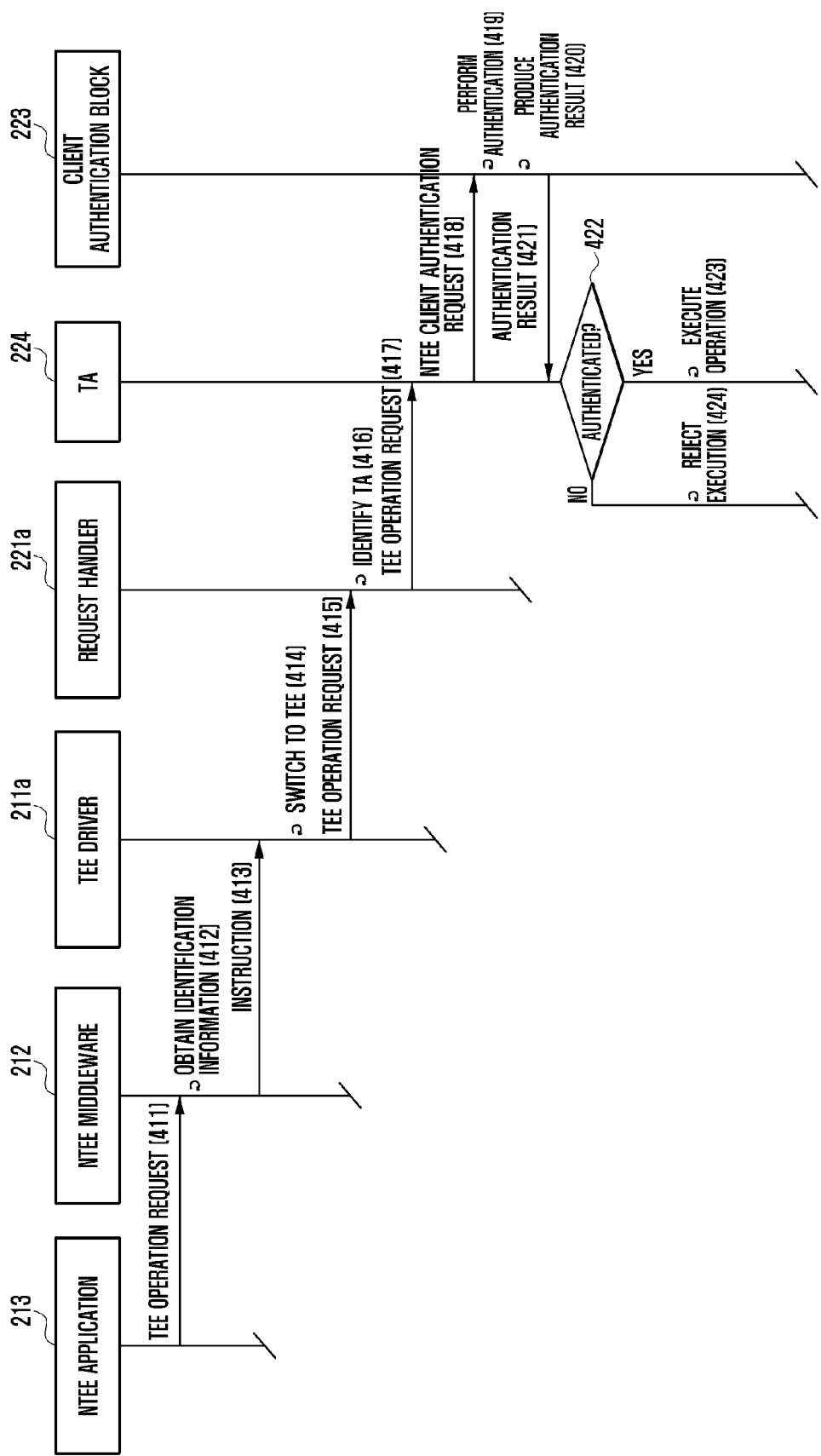
FIG. 4 is a sequence chart illustrating an application authentication method according to an embodiment of the present invention.

FIG. 4 is a sequence chart illustrating an application authentication method according to an embodiment of the present invention.

Referring to FIGS. 2 and 4, at step 411, an NTEE application 213 in the NTEE 210 sends a TEE operation request to the NTEE middleware 212. At step 412, the NTEE middleware 212 obtains identification information of the NTEE application 213 from the kernel 211. At step 413, the NTEE middleware 212 instructs the TEE driver 211a to request TEE operation and inserts identification information of the NTEE application 213 into the TEE operation request. Alternatively, the NTEE application 213 may directly contact the TEE driver 211a (refer to FIG. 2). Specifically, the NTEE application 213 may directly instruct the TEE driver 211a to request TEE operation and insert identification information of the NTEE application 213 into the TEE operation request. Then, the TEE driver 211a obtains identification information of the NTEE application 213 from the kernel 211 and inserts the obtained identification information into the TEE operation request.

In response to the instruction from the NTEE middleware 212 or the NTEE application 213, at step 414, the TEE driver 211a invokes the monitor 230 to switch to the TEE. At step 415, the TEE driver 211a sends the TEE operation request together with NTEE client identification information via the monitor 230 to the TEE 220. In the TEE 220, the request handler 221a receives and processes the TEE operation request. Specifically, at step 416, the request handler 221a identifies a trusted application 224 to handle the TEE operation request. At step 417, the request handler 221a forwards the TEE operation request together with the NTEE client identification information to the identified trusted application 224.

Upon reception of the operation request and NTEE client identification information, at step 418, the trusted application 224 sends an identification request to the client authentication block 223, providing NTEE client identification information, NTEE client RIMD and RIM verification key as parameters of the request.

At step 419, the client authentication block 223 determines whether to authenticate the NTEE client. More specifically, step 419 may be performed as follows.

The client authentication block 223 accesses the memory configuration data 223a, and finds a data structure containing the NTEE client identification information provided by the trusted application 224 in the kernel memory of the NTEE memory region 131. The client authentication block 223 further analyzes the found data structure using the memory configuration data 223a to locate memory management information related to the NTEE client (refer to FIG. 3).

Here, the memory management information contains at least correspondence of memory regions with client application code, data and other application-related information. Hence, the memory parser 223b of the client authentication block 223 analyzes at least memory regions containing code of the NTEE client (other memory regions may also be analyzed as well) to produce a list of addresses of memory regions suitable for application authentication.

The memory parser 223b computes a specific value corresponding to the NTEE client using the NTEE client identification information to perform NTEE client authentication. Specifically, the memory parser 223b calculates a pre-defined hash function over contents of memory regions in the address list to produce a hash value. The client authentication block 223 decrypts a digital signature from NTEE client RIMD using a RIM verification key to obtain a reference hash value. The client authentication block 223 compares the reference hash value with the hash value obtained by the memory parser 223b.

At step 420, the client authentication block 223 produces an authentication result for the NTEE client. For example, when the reference hash value matches the obtained hash value, the client authentication block 223 generates an authentication result indicating success of NTEE client authentication. Otherwise, the client authentication block 223 generates an authentication result indicating failure of NTEE client authentication.

At step 421, the client authentication block 223 sends the authentication result to the trusted application 224. At step 422, the trusted application 224 examines the received authentication result to determine if the NTEE client has been authorized. If the authentication result indicates success of NTEE client authentication, at step 423, the trusted application 224 executes the requested operation. If the authentication result indicates failure of NTEE client authentication, at step 423, the trusted application 224 rejects execution of the requested operation or performs only a portion of the requested operation. Alternatively, the trusted application 224 may provide the user with the authentication result indicating success or failure of authentication and may request the user to decide a subsequent action (e.g. rejection, limited execution, or continued execution) according to the authentication result.

In another embodiment, the memory configuration data may contain additional information on specific NTEE memory regions. In this case, the TEE trusted application 224 may authenticate other memory regions of the NTEE, being not limited to a memory region assigned to a specific NTEE client.

In another embodiment, NTEE kernel code and static data can be authenticated by the TEE trusted application 224. To achieve this, the client authentication block needs to be capable of accessing the NTEE kernel code and static data memory through the memory configuration data. As a result, the client authentication block 223 may calculate a hash value of the NTEE kernel code and static data and compare the calculated hash value with the reference hash value in the same way as for NTEE clients.

In another embodiment, NTEE kernel loadable modules may be authenticated by the TEE trusted application 224. To achieve this, the client authentication block needs to be capable of accessing NTEE kernel loadable modules code memory according to the memory configuration data. As a result, the client authentication block 223 may calculate a hash value of the NTEE kernel loadable modules and compare it with the reference hash value in the same way as for NTEE clients.

In the above embodiments, NTEE clients (such as NTEE native applications and Android applications), middleware, kernel, kernel loadable modules, application programming interfaces and the client authentication block 223 are types of software programs.

One embodiment of the present invention may be applied to a secure storage system such as the electronic device 100. In a secure storage system, an NTEE client may request a TEE secure storage TA (trusted application) to securely save some data. The TEE secure storage TA may identify the NTEE client by a hash value of the NTEE client code in the NTEE memory and securely save the data together with the hash value. Later, when the NTEE client requests its data, the TEE secure storage TA may authenticate the NTEE client by calculating a hash value over NTEE memory code and comparing it with the previously stored hash value. If the two hash values match, the TEE secure storage TA provides decrypted data back to the requesting NTEE client. Otherwise, the TEE secure storage TA may consider the NTEE client as unauthenticated and may not provide the decrypted data thereto.

One embodiment of the present invention may be applied to a secure run-time monitoring system for the NTEE integrity status. A TEE trusted application 224 may have a list of NTEE applications to be checked for integrity upon request from the NTEE or periodically check. The TEE trusted application 224 may request the client authentication block to check integrity status of specific NTEE applications. Based on the results of the integrity check, the TEE trusted application 224 can modify its behavior.

Alternatively, in addition to the integrity check for NTEE applications, the TEE trusted application 224 may check integrity of the NTEE kernel and loadable kernel objects (e.g. drivers). If the integrity check of the NTEE fails, the TEE trusted application 224 may take special actions. Here, the special actions may include, without being limited to, notifying other TEE trusted applications 224 of the NTEE integrity check results, requesting the TEE to limit its operation, and the like. Alternatively, the trusted application 224 may provide the user with the integrity check result indicating success or failure and may request the user to decide a subsequent action according to the integrity check result.

In various embodiments, a memory region (or a portion thereof) authenticatable by the trusted application 224 may be a memory region (or a portion thereof) of a different device connectable in a wired or wireless manner with the electronic device 100.

The application authentication method of the present invention may be implemented as computer programs and may be stored in various computer readable storage media. The computer readable storage media may store program instructions, data files, data structures, and combinations thereof. The program instructions may include instructions developed specifically for the present invention and existing general-purpose instructions. The computer readable storage media may include magnetic media such as a hard disk and floppy disk, optical media such as a CD-ROM and DVD, magneto-optical media such as a floptical disk, and memory devices such as a ROM, RAM and flash memory. The program instructions may include machine codes produced by compilers and high-level language codes executable through interpreters.

While the present invention has been shown and described with reference to various embodiments thereof, it should be understood by those skilled in the art that many variations and modifications of the method and apparatus described herein will still fall within the spirit and scope of the present invention as defined in the appended claims and their equivalents.

What is claimed is:

1. A method for operating an electronic device including a processor configured to operate in a first mode or a second mode and a memory including a first region and a second region, the method comprising:
 executing, by the processor, the first mode, wherein the first mode is more secure than the second mode;
 receiving, by the processor operating in the first mode, data or information related to a non-secure software program stored in the first region; and
 authenticating, by the processor operating in the first mode, at least a portion of the data or information using a secure software program stored in the second region, wherein authenticating the at least a portion of the data or information comprises comparing a value computed from at least a portion of the received data or information with a pre-stored value, and wherein the value computed from at least a portion of the received data or information represents memory address information of at least a part of the non-secure software program.

2. The method of claim 1, wherein the processor accesses at least one of the first region and the second region in the first mode, and wherein the processor accesses only the first region in the second mode.

3. The method of claim 1, wherein the first mode corresponds to a secure mode and the second mode corresponds to a non-secure mode.

4. The method of claim 1, wherein receiving the data or information comprises utilizing identification information of at least a part of the non-secure software program.

5. The method of claim 1, wherein at least a part of the non-secure software program is at least one of at least a portion of a kernel, at least a portion of middleware, at least a portion of an application programming interface, and at least a portion of an application.

6. The method of claim 1, further comprising storing data received from the non-secure software program or sending stored data to the non-secure software program according to an authentication result.

7. The method of claim 1, further comprising determining to perform an operation of the first mode according to an authentication result or providing the authentication result to a user.

8. An electronic device comprising:
a memory unit including a first region and a second region; and
a processor configured to execute a first mode and a second mode, wherein the first mode is more secure than the second mode,
wherein the processor, when executing the first mode, receives data or information related to a non-secure software program stored in the first region of the memory unit and authenticates at least a portion of the received data or information using a secure software program stored in the second region of the memory unit,
wherein the processor compares a value computed from at least a portion of the received data or information with a pre-stored value for authentication, and
wherein the value computed from at least a portion of the received data or information represents memory address information of at least a part of the non-secure software program.

9. The electronic device of claim 8, wherein the processor is configured to access at least one of the first region and the second region of the memory unit in the first mode, and wherein the processor is configured to access only the first region of the memory unit in the second mode.

10. The electronic device of claim 8, wherein the first mode corresponds to a secure mode and the second mode corresponds to a non-secure mode.

11. The electronic device of claim 8, wherein the processor utilizes identification information of at least a part of the non-secure software program to receive the data or information related thereto.

12. The electronic device of claim 8, wherein at least a part of the non-secure software program is at least one of at least a portion of a kernel, at least a portion of middleware, at least a portion of an application programming interface, and at least a portion of an application.

13. The electronic device of claim 8, wherein the processor stores data received from the non-secure software program or sends stored data to the first non-secure software program according to an authentication result.

14. The electronic device of claim 8, wherein the processor determines to perform an operation of the first mode according to an authentication result or provides the authentication result to a user.

15. An electronic system comprising:
at least one memory unit including a first region and a second region; and
a processor configured to execute a first mode and a second mode, wherein the first mode is more secure than the second mode,
wherein the processor, when executing the first mode, receives data or information related to a non-secure software program stored in the first region of the at least one memory unit and authenticates at least a portion of the received data or information using a secure software program stored in the second region of the memory unit,
wherein the processor compares a value computed from at least a portion of the received data or information with a pre-stored value for authentication, and
wherein the value computed from at least a portion of the received data or information represents memory address information of at least a part of the non-secure software program.

16. The electronic system of claim 15, wherein the at least one memory unit is physically separated into two partitions, and wherein the first region is included in one partition and the second region is included in the other partition.

* * * * *